May 27, 1947. J. M. TYRNER 2,421,095
APPARATUS FOR FILLET ARC WELDING
Filed April 3, 1945
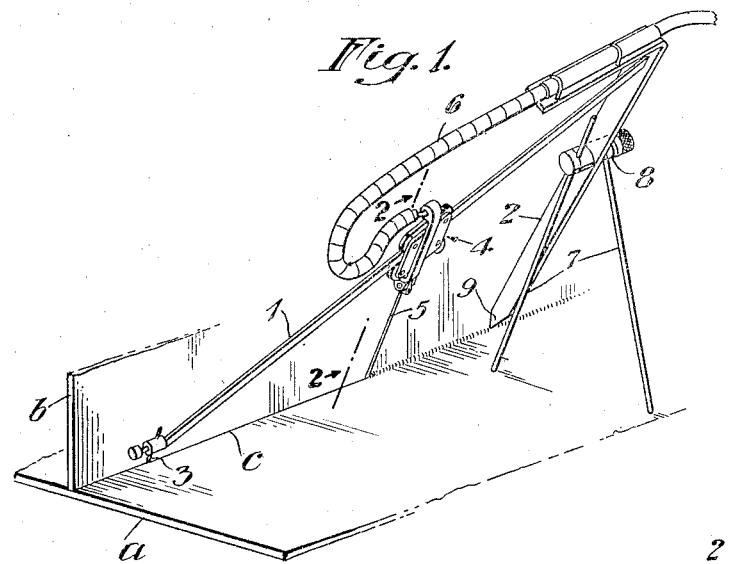
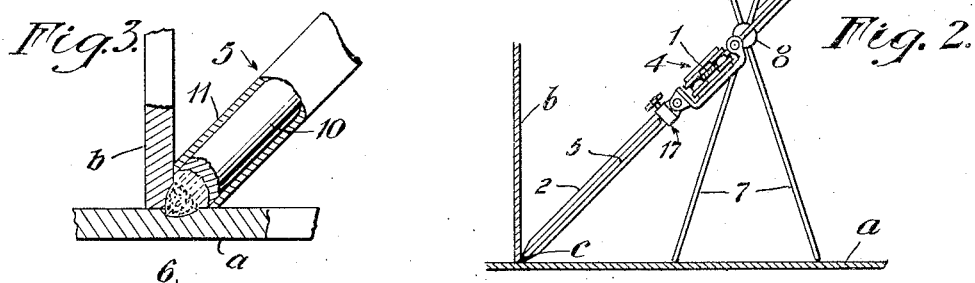
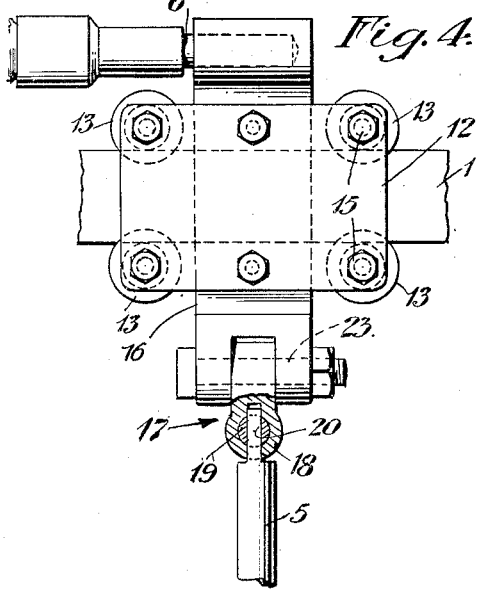
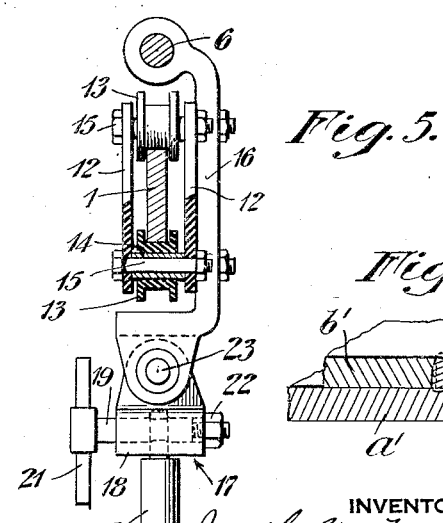
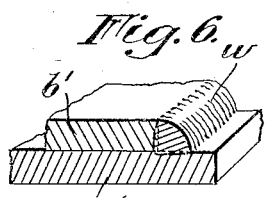
INVENTOR
Joseph M. Tyrner
BY
ATTORNEYS

UNITED STATES PATENT OFFICE 2,421,095

APPARATUS FOR FILLET ARC WELDING

Joseph M. Tyrner, New York, N. Y., assignor to Air Reduction Company, Incorporated, a corporation of New York Application April 3, 1945, Serial No. 586,385

3 Claims. (Cl. 219—8)

This invention relates to fillet arc welding, and has for its principal object to provide improved apparatus for making that type of arc weld.

The arc welding apparatus of the invention is generally similar to that disclosed in my copending application Serial No. 543,883, filed July 7, 1944, now Patent No. 2,412,660, for making butt welds but embodies the changes hereinafter described to adapt it for use in making fillet welds.

Fillet arc welding apparatus embodying the invention is illustrated in the accompanying drawing, in which:

Fig. 1 is a perspective view of the apparatus in position to make a fillet weld at the interior corner of two metal plates positioned at right angles to each other;

Fig. 2 is a vertical transverse section taken approximately on the line 2—2 of Fig. 1;

Fig. 3 is an enlarged detail view, partly in transverse section, showing the type of electrode that may be used and how it rides in the work corner along which the fillet weld is to be made;

Fig. 4 is a side elevation of the electrode carriage;

Fig. 5 is an end elevation, partly in section, of the electrode carriage shown in Fig. 4; and Fig. 6 is a perspective view showing a fillet weld at a lap joint that may be made by the apparatus of the invention.

Referring first to Fig. 1, the work-pieces to be welded are represented as a horizontal plate $a$ and a vertical side plate $b$. The surfaces of the plates form a work corner along which the fillet weld is to be made. They may be said to form also a dihedral angle having a vertex line $c$ which also constitutes the corner line along which the fillet weld is to be made.

The improved apparatus for making the fillet weld along the work corner comprises an inclined guide rail 1 supported at its rear end by a leg 2 and at its forward end by a rod or pin 3. Mounted for movement on the guide rail 1 is an electrode carriage 4 of any suitable type. The carriage is preferably movable by gravity down the guide rail 1, although in accordance with some phases of the invention, it may be power driven. Secured to the carriage, in a manner hereinafter described and depending therefrom, is a welding electrode 5. Current is conducted to the electrode by means of a flexible cable 6. A pair of props 7 are adjustably connected to the leg 2 by means of a clamp 8 to hold the leg upright.

The apparatus thus far described is similar to that disclosed in my copending application above referred to. However, to adapt it for use in making a fillet weld the props 7 support the leg 2 in an inclined position so that the downwardly inclined guide rail 1 lies in an inclined plane in which the vertex line $c$ of the dihedral angle also lies and which makes an angle with the vertical wall of the work corner—this angle preferably being approximately 45°, as best shown in Fig. 2. The pin 3 supports the lower end of the guide rail 1 in the work corner and the lower end of the leg 2 may be pointed as shown at 9 to engage in the work corner.

The electrode 5 may be of the coated crater forming type illustrated in Fig. 3 having a core 10 of weld metal and an exterior coating 11 of fusible material which is a relatively poor conductor of electricity. The coating at the tip of the electrode continually contacts with the work and melts at a rate such that the metal of the core is kept out of contact with the work to maintain an arc between the core metal and the work.

It will now be seen that as the electrode is consumed the carriage 4 moves by gravity down its guide rail 1 and maintains the tip of the electrode in contact with the work and also draws the tip of the electrode along the work corner to make the weld. The reason for supporting the guide rail 1 in the above mentioned inclined plane, will be more fully explained after the electrode carriage and the means for connecting the electrode to it are described in greater detail.

As above stated, the electrode carriage may be of any suitable type that will move freely down the guide rail 1 by gravity as the electrode is consumed, unless it is of the power driven type, in which case it may be moved along the guide rail by power means of any well known type at a speed which is coordinated with the rate of consumption of the electrode. The particular carriage illustrated in the drawing is like one modification of the torch carriage disclosed in the above-mentioned copending application. It comprises a pair of plates 12 (Figs. 4 and 5) made of insulating material between which are mounted four insulating flanged rollers 13, one at each corner of the plates. The rollers are adapted to ride on the upper and lower edges of the guide rail 1. The rollers are mounted on sleeves 14 which serve to maintain the side plates 12 in spaced relation when bolts 15 passing through the sleeves and side plates are tightened. Attached to one of the side plates is a metal plate 16, to the upper end of which the cable 6 is electrically connected and to the lower end of which is connected an electrode holder 17. The electrode holder may comprise a sleeve 18, whose axis is disposed at right angles to the axis of the electrode 5, having a transverse opening to receive the upper end of the electrode. A rotatable rod 19 has a transverse opening 20 (Fig. 4) which may be aligned with the opening in the sleeve by turning a handle 21 secured to the rod. When the openings in the sleeve and rod are thus aligned, the upper end of the electrode may be inserted in the holder, and upon tightening a nut 22 threaded on the end of the rod 19, the rod is moved axially to clamp the end of the electrode in the holder. The holder is preferably connected to the metal plate 16 by a bolt 23 which when loosened permits the electrode holder to pivot about the axis of the bolt and thereby allow movement of the tip of the electrode in a direction transverse to the line of travel of the electrode for the purpose hereinafter mentioned. The electrode holder 17 is made of metal so that current is conducted from the conductor 6 through the metal plate 16 and electrode holder to the electrode and then through the work which may be electrically connected in the welding circuit.

By supporting the inclined guide rail 1 so that it lies in an inclined plane in which the corner line c also lies, the upper end of the electrode is not only guided downwardly but it is also guided toward the work corner or toward the vertical wall of the work corner. In other words, the inclination of the guide rail 1 toward the work corner, or the vertical wall of the corner, gives to the upper end of the electrode a directional component of movement toward the work corner as the carriage moves down the inclined guide rail. Therefore, as the electrode is consumed, the tip of the electrode is induced to follow the corner. Offhand, it would seem that as the electrode is consumed, the tip of the electrode would have a tendency to swing outwardly over the plate a away from the corner; but this does not happen because as fast as the electrode is consumed the tip is not only drawn along the corner but is continuously drawn in a direction toward the vertical wall of the work corner. Therefore, no guiding means for the lower end of the electrode, such as that disclosed in the above-mentioned copending application, is required. The tip of the electrode is guided solely by the work corner into which it is continually urged as it moves longitudinally of the corner by the double inclination of the guide rail 1, i. e., its downward inclination and its inclination from its upper end toward the vertical wall of the work corner. To accomplish the desired result the guide rail may be located in any inclined plane in which the corner line of the work corner lies, i. e. any inclined plane which divides the dihedral angle formed by the work corner, but preferably it lies in an inclined plane which bisects the dihedral angle formed by the work corner, as shown in Fig. 2, or makes an angle of approximately 45° with the vertical wall of the work corner. Under these circumstances, the upper end of the electrode is given a sufficient directional component of movement toward the vertical wall of the work corner and at the same time the guide rail has sufficient downward inclination to cause the desired movement of the carriage down the guide rail by gravity as the electrode is consumed.

It will now be seen that the reason for pivotally connecting the electrode holder to the carriage is to allow the tip of the electrode to follow in the work corner even though the guide rail 1 may not be in perfect alignment with the corner line or vertex line of the dihedral angle. Of course, any other type of connection between the electrode holder and the carriage that will permit the desired transverse movement of the electrode tip may be employed.

The apparatus may be used for making any type of fillet weld along a work corner, whether the work corner is formed by two angularly disposed plates or not. An example of another type of fillet weld that may be made is illustrated in Fig. 6. Here the plates a' and b' are positioned to make what is known as a lap joint, and the weld shown at w, while commonly referred to as a lap weld, may also be regarded as a fillet weld, the work corner along which the weld is made then being the horizontal face of the plate a' and the vertical edge face of the plate b'.

I claim:

1. Arc welding apparatus for making fillet welds along a work corner comprising a guide, means supporting said guide so that it is downwardly inclined and also inclined with respect to the vertical wall of the work corner, said means being adjustable to vary the angle of inclination between the guide and the vertical wall of the work corner, a carriage movable downwardly along the guide, and a welding electrode supported at its upper end by said carriage and depending to make contact at its lower end with the work corner, said downwardly inclined guide being the sole guiding means for the electrode and serving by reason of its inclination in the two directions to not only keep the tip of the electrode in contact with the work as the electrode is consumed but also to induce the tip of the electrode to follow the work corner even though the lower end of the electrode is unguided except by the work corner itself.

2. Arc welding apparatus for making fillet welds along a work corner comprising a guide, means supporting said guide so that it is downwardly inclined and so that it lies in an inclined plane in which the vertex line of the dihedral angle formed by the work corner also lies, said means being adjustable to vary the inclination of said inclined plane, a carriage movable downwardly along the guide, and a welding electrode supported at its upper end by said carriage and depending to make contact at its lower end with the work corner, said downwardly inclined guide being the sole guiding means for the electrode and serving not only to keep the tip of the electrode in contact with the work as the electrode is consumed but also because of its disposition in said inclined plane to induce the tip of the electrode to follow the work corner even though the lower end of the electrode is unguided except by the work corner itself.

3. Gravity-feed arc welding apparatus for making a fillet weld along a work corner comprising a guide, means supporting said guide so that it is downwardly inclined and so that it lies in an inclined plane in which the vertex line of the dihedral angle formed by the work corner also lies, said means being adjustable to vary the inclination of said inclined plane, a carriage mounted on said guide, and a welding electrode supported at its upper end by the carriage and depending to make contact at its lower end with the work corner, said carriage being movable down the inclined guide by gravity as the electrode is consumed to maintain the tip of the electrode in contact with the work corner and to draw it along the corner, said downwardly inclined guide being the sole guiding means for the electrode and serving by reason of its disposition in said inclined plane to induce the tip of the electrode to follow the work corner even though the lower end of the electrode is unguided except by the work corner itself.

JOSEPH M. TYRNER.

REFERENCES CITED

The following references are of record in the file of this patent:

UNITED STATES PATENTS

| Number | Name | Date |
|---|---|---|
| 2,163,439 | Somerville | June 20, 1939 |
| 2,182,575 | Baird et al. | Dec. 5, 1939 |

FOREIGN PATENTS

| Number | Country | Date |
|---|---|---|
| 550,727 | Great Britain | Jan. 21, 1943 |
| 112,353 | Great Britain | Mar. 9, 1917 |